United States Patent
Schneider et al.

(10) Patent No.: US 6,315,338 B1
(45) Date of Patent: Nov. 13, 2001

(54) VEHICLE BRUSH GUARD APPARATUS

(75) Inventors: Michael J. Schneider, Ann Arbor; James J. Bartel, Commerce; Edwin M. Adelman, Farmington Hills, all of MI (US)

(73) Assignee: Transportation Design & Manufacturing, Livonia, MI (US)

( * ) Notice: Subject to any disclaimer, the term of this patent is extended or adjusted under 35 U.S.C. 154(b) by 0 days.

(21) Appl. No.: 09/689,965

(22) Filed: Oct. 12, 2000

(51) Int. Cl.$^7$ .................................................... B60R 19/52
(52) U.S. Cl. ..................... 293/115; 293/155; 293/102; 180/68.6
(58) Field of Search ..................... 293/116, 155, 293/102; 180/686; D12/163, 169, 170, 171

(56) References Cited

U.S. PATENT DOCUMENTS

| | | | |
|---|---|---|---|
| 3,828,449 | * 8/1974 | Miceli | 293/70 |
| 4,099,760 | 7/1978 | Mascotte et al. | 293/73 |
| 4,168,855 | 9/1979 | Koch | 293/115 |
| 4,215,495 | * 8/1980 | Wehr | 293/106 |
| 4,304,056 | * 12/1981 | Watson et al. | 37/41 |
| 4,657,294 | * 4/1987 | Rumpp | 293/115 |
| 4,671,552 | * 6/1987 | Andrson et al. | 293/144 |
| 4,836,598 | * 6/1989 | Mastin | 296/91 |
| 4,995,660 | * 2/1991 | Hornsky et al. | 293/132 |
| 5,080,412 | 1/1992 | Stewart et al. | 293/155 |
| 5,224,636 | * 7/1993 | Bounds | 224/42.44 |
| 5,277,465 | 1/1994 | Weir | 293/142 |
| 5,326,133 | * 7/1994 | Breed et al. | 180/274 |
| 5,326,142 | * 7/1994 | Dodds et al. | 293/115 |
| 5,366,264 | * 11/1994 | Guay | 293/125 |
| 5,570,826 | * 11/1996 | Garbed et al. | 224/524 |
| 5,636,885 | * 6/1997 | Hummel | 293/115 |
| 5,695,228 | * 12/1997 | Storer | 293/115 |
| 5,829,805 | * 11/1998 | Watson | 293/155 |
| 5,836,493 | * 11/1998 | Gunsted et al. | 224/519 |
| 5,941,329 | * 8/1999 | Ichioka et al. | 293/115 |
| 6,113,164 | * 9/2000 | Setina | 293/142 |
| 6,231,093 | * 5/2001 | Storer | 293/115 |

\* cited by examiner

*Primary Examiner*—Stephen T. Gordon
*Assistant Examiner*—Kiran B. Patel
(74) *Attorney, Agent, or Firm*—Young & Basile, P.C.

(57) ABSTRACT

A brush guard is attachable to a vehicle frame rail or a vehicle bumper mounting bracket by means of mounting members, each having a mounting surface mountable between the bumper mounting bracket and the bumper frame rail mounting bracket. Each mounting member includes a crush surface positioned in the same spatial relationship from a vehicle mounted sensor crush surface as the original crush surface of a bumper mounting bracket. The brush guard is mounted on the vehicle independent and free of the bumper and is disposed in a position so that the brush guard does not extend forwardly of the frontmost surface of the bumper. In one aspect, the mounting members are pivotally connected to the vehicle to allow pivotal movement of the brush guard during a front-end vehicle collision. A pair of optional outriggers are releasably secure to the outer lateral ends of the brush guard and the vehicle bumper.

19 Claims, 6 Drawing Sheets

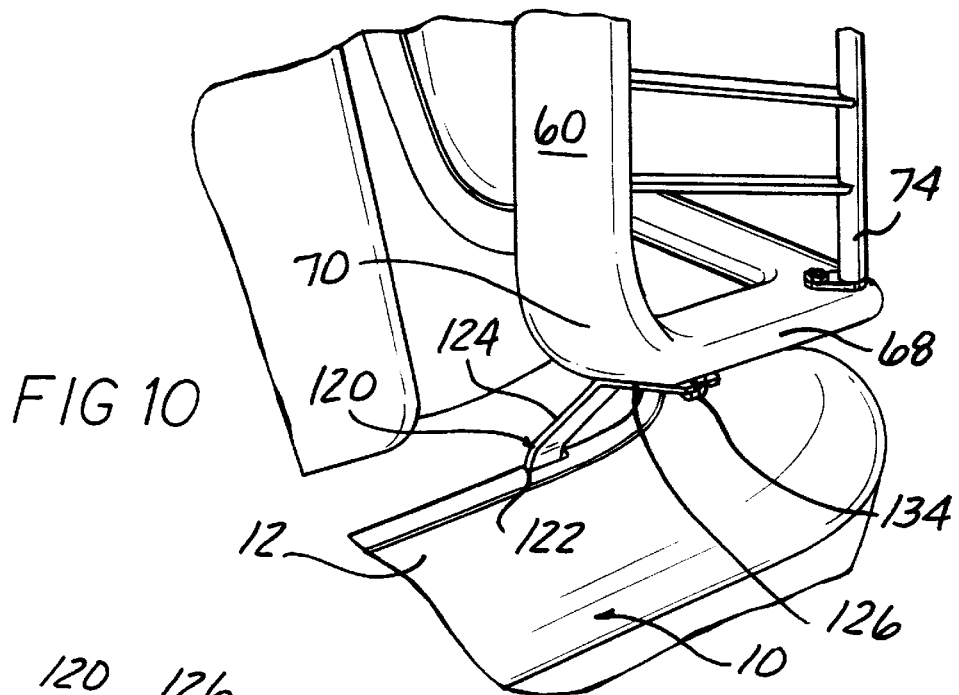
FIG 10
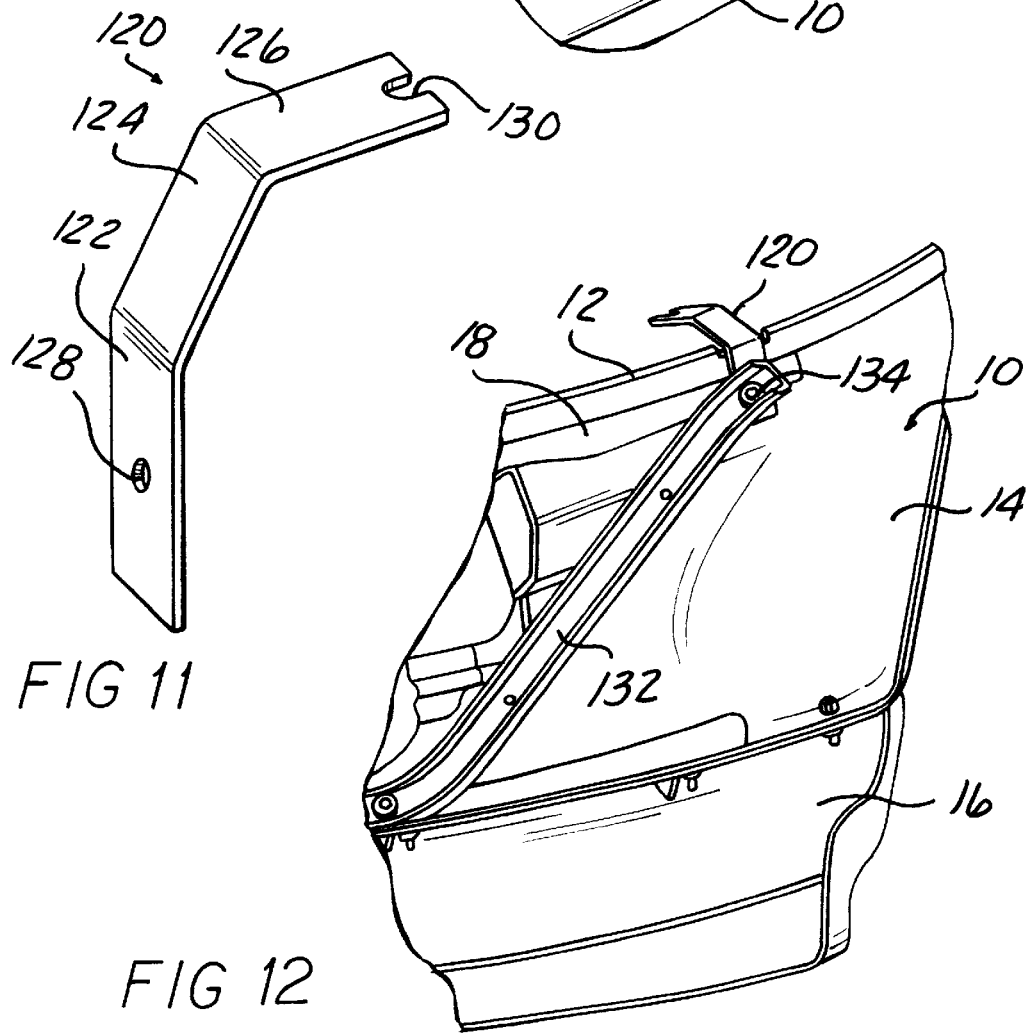
FIG 11
FIG 12

VEHICLE BRUSH GUARD APPARATUS

BACKGROUND

1. Field of the Invention

The present invention relates, in general, to vehicle grille or brush guards.

2. Description of the Art

Vehicle grille or brush guards are typically formed of a tubular frame structure having horizontal slats and/or vertical posts mounted within an outer frame. The brush guard is mounted by means of brackets in front of the vehicle grille and headlights.

Typically, brush guards have been mounted over the top and front of the bumper and connected to the top or side of the vehicle frame rails or extend below the bumper to a connection with the bottom of the frame rails. Such mounting arrangements place a portion of the brush guard in front of the vehicle front bumper where it is in a position to contact an object during a front collision before the bumper engages the object.

However, the placement of a vehicle brush guard in front of the bumper raises a significant problem with respect to the on-board collision sensors which are designed for interaction with crush surfaces in the vehicle to activate a passenger restraint, such as an air bag, at the proper time during a front end collision so that the air bag inflates in sufficient time to absorb forward motion of the vehicle front seat occupant(s).

The conventional mounting of vehicle brush guards in front of the vehicle will cause the vehicle crush surfaces to begin their movement toward each other and result in an earlier engagement with and earlier triggering of the vehicle collision sensors which activate the air bag restraint slightly earlier than would be normal if the vehicle did not have a brush guard and the vehicle bumper itself, as it was originally designed, first contacted the object. An earlier than designed activation of the air bag during a front collision will cause the air bag to inflate earlier than normal such that the air bag itself would be starting to deflate when first contacted by a vehicle front seat occupant. This, of course, negates the restraint features provided by the air bag.

Thus, it would be desirable to provide a vehicle brush guard mountable in front of the vehicle grille which does not change the spatial relationship between the vehicle crush surfaces which trigger collision sensors used to activate a vehicle passenger restraint air bag in a front end collision.

SUMMARY

The present invention is a vehicle attachment is the form of a brush guard mountable on a vehicle in a position which does not change the vehicle front end collision sensor activation sequence during a front-end collision with the vehicle bumper. In one aspect, the vehicle attachment is a brush guard and a mounting member for mounting the brush guard to a vehicle frame where the front surface of the brush guard is disposed behind a front-most edge of the front vehicle bumper.

The brush guard, in an exemplary aspect, is constructed of spaced, joined members. Each of a pair of mounting members includes means for attaching the mounting members to the brush guard. Each mounting member includes a mounting surface or portion mountable between the bumper mounting bracket and the bumper frame rail mounting bracket of a vehicle. Each mounting member also has a crush surface which is designed to be positioned in the same spacial relationship from a vehicle mounted sensor activation crush surface as the original crush surface on the bumper mounting bracket.

In one aspect of the invention, a pair of brush guard mounting members are provided on the brush guard. Each one of the pair of brush guard mounting members has a first crush surface nominally spaced from a sensor crush surface at the first spacing.

In another aspect of the invention, outrigger support brackets are mounted between a laterally outboard position of the brush guard and the vehicle bumper. Preferably, the brush guard is releasably connected to the outrigger support bracket.

The brush guard mounting member, in one aspect, is movably mountable on the bumper mounting bracket. In another aspect, the brush guard mounting member is pivotal relative to the bumper mounting bracket under vehicle collision forces.

The mounting members provide a secure mount for a brush guard on a vehicle without requiring the brush guard to be attached to the bumper of the vehicle. More importantly, the mounting members mount the brush guard on a vehicle in a position above the top surface of the bumper so that the brush guard does not extend forwardly of the foremost surface of the bumper. This prevents the brush guard from interfering with the normal crush sequence of the bumper and collision sensors of the vehicle during a front end collision.

The crush surfaces formed on the brush guard mounting members act in the same fashion as similar crush surfaces normally found on the bumper mounting brackets to trigger or activate the vehicle collision sensors at the same time during a front collision as the bumper mounting brackets in a vehicle crush sequence for nominal operation of the inflatable passenger restraint air bags.

The present brush guard is easily attachable to existing vehicles despite the different vehicle bumper mounting configurations.

BRIEF DESCRIPTION OF THE DRAWING

The various features, advantages and other uses of the present invention will become more apparent by referring to the following detailed description and drawing in which:

FIG. 10 is a perspective view showing an outrigger bracket according to one aspect of the invention connecting the side outboard portion of the vehicle brush guard to the vehicle bumper;

FIG. 11 is a perspective view of the outrigger mounting bracket shown in FIG. 10; and FIG. 12 is a rear perspective view of the vehicle bumper showing the mounting of the outrigger mounting bracket to the bumper.

DESCRIPTION OF THE PREFERRED EMBODIMENTS

Figure 1:
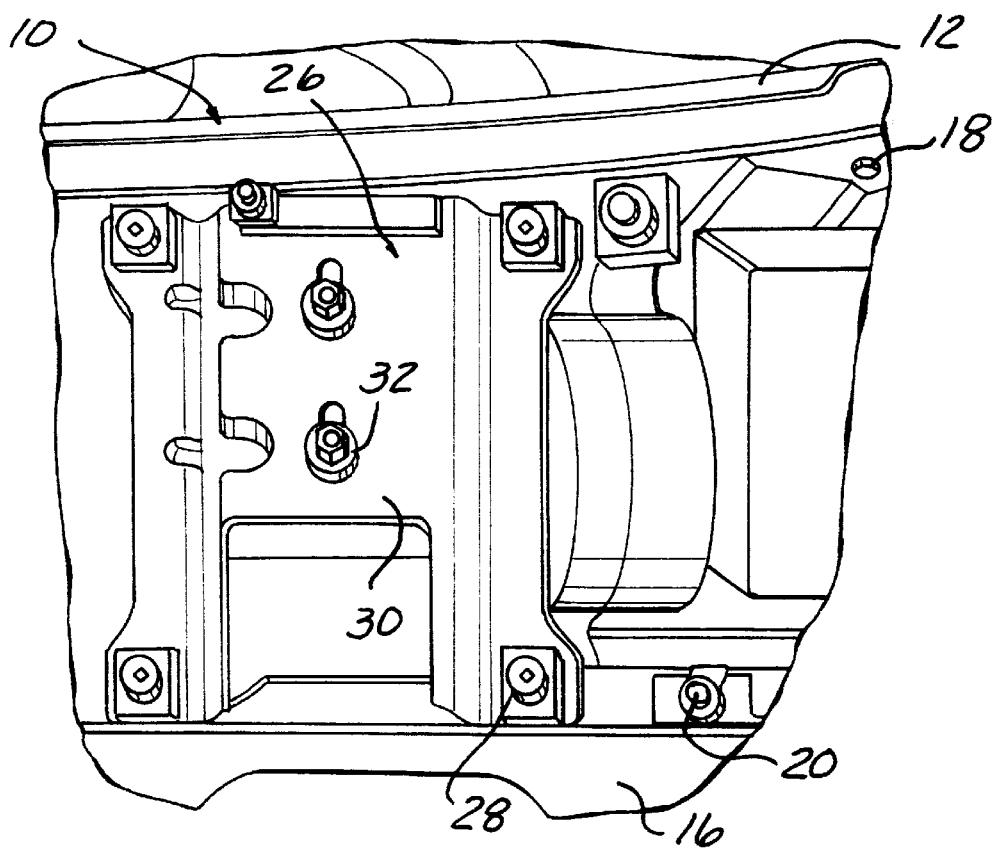
FIG. 1 is a rear perspective view of a vehicle bumper showing a vehicle bumper mounting bracket.
Figure 2:
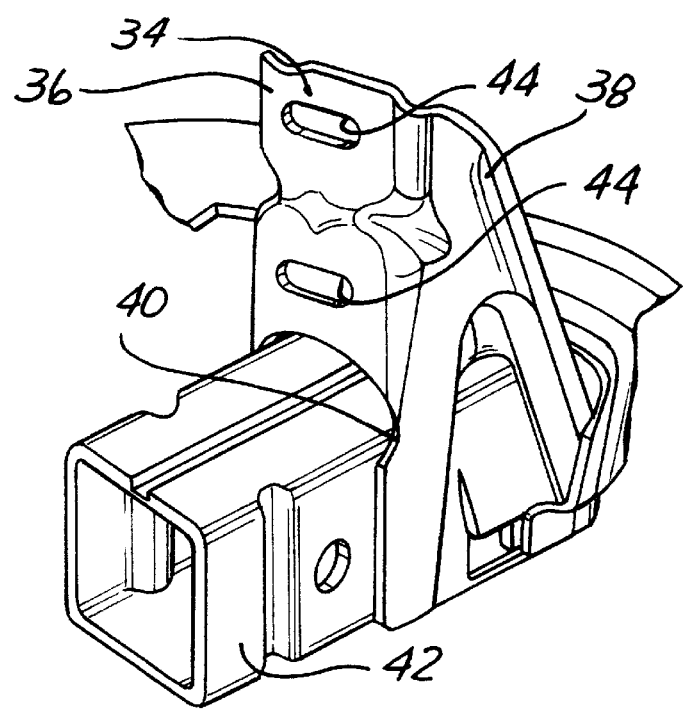
FIG. 2 is a perspective view of a vehicle frame rail showing the bumper frame rail mounting bracket mounted thereon.
Figure 3:
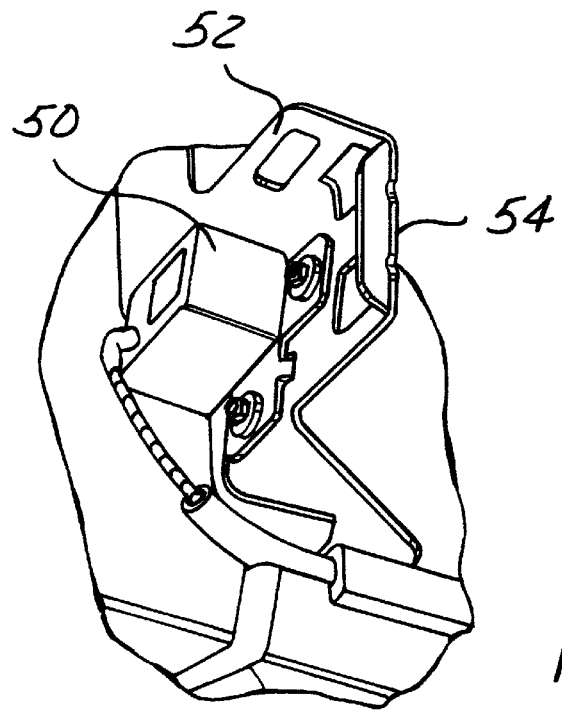
FIG. 3 is a bottom perspective view of a typical collision sensor and sensor mounting bracket.
Figure 4:
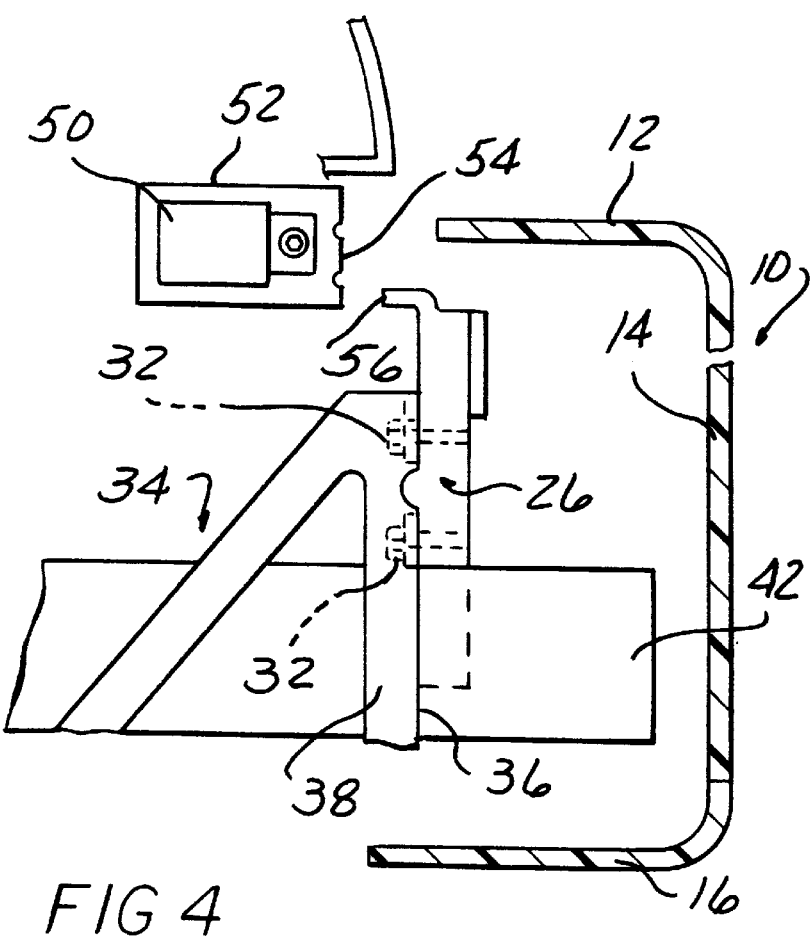
FIG. 4 is a side elevational, partially cross-sectioned view showing the spatial relationships of the bumper mounting bracket, the bumper, the bumper frame rail mounting bracket, the frame rail, the collision sensor and the collision sensor mounting bracket in their normal mounted positions.

Referring now to the drawing, and to FIGS. 1–4 in particular, there is depicted a typical bumper front fascia assembly for a vehicle. The bumper assembly includes a conventional bumper 10 which may be formed of any suitable material, such as metal, formed plastic, etc. As shown in FIGS. 1 and 4, the bumper 10 includes a top generally horizontally extending top wall 12, a front, vertically extending wall 14 and a bottom, inward curved bottom wall 16. A metal frame 18 is mounted on an inside surface of the bumper 10 and is joined to the bumper 10 by suitable fasteners, such as J-nuts 20.

A bumper mounting bracket shown generally by reference number 26 is secured by fasteners 28 to the metal frame 18. The bumper mounting bracket 26, which may take any suitable shape, includes, by example, a raised center portion 30 having apertures which receive fasteners, such as bolts 32, for attaching the bumper mounting bracket 26 to a bumper frame rail mounting bracket 34 shown in FIG. 2.

The bumper frame rail mounting bracket 34 is of a generally U-shaped member having an end wall 36 and opposed side walls 38, only one of which can be seen in FIG. 2. The side walls 38 include an open ended aperture, such as a generally triangular aperture, which divides each side wall 38 into spaced leg portions as shown in FIGS. 2 and 4. The end wall 36 terminates short of the end of the side walls 38 to form an opening 40 in conjunction with the lower extended portions of the side walls 38 which enables the mounting bracket 34 to be disposed over a conventional tubular frame rail 42 and secured thereto by suitable fasteners, welds, etc. A pair of apertures 44 are formed in the bumper frame rail mounting bracket 34 and alignable with the apertures in the bumper mounting bracket 26 to receive the fasteners or bolts 32 to normally secure the bumper mounting bracket 26 to the bumper frame rail mounting bracket 34 and thereby attaching the vehicle bumper 10 to the vehicle frame rails 42.

As shown in FIGS. 3 and 4, a conventional vehicle collision sensor depicted generally by reference number 50 is mounted on a sensor mounting bracket 52 to stationary vehicle structure. A crush surface 54 is formed at one end of the bracket 52 and adapted to engage a corresponding bumper crush surface 56 formed on the end of a tab extending from the center portion 30 of the bumper mounting bracket 26 as shown in FIG. 4 during a front collision. While in the normal mounting position of the bumper 10 relative to the frame rails 42, opposed faces of the crush surfaces 54 and 56 are spaced apart. However, during a collision, once the bumper 10 becomes stationary upon engagement with an object, the momentum of the vehicle will cause the frame rails 42 to continue to move in a forward direction. After a predetermined amount of advance, the crush surface 54 will engage the crush surface 56 thereby causing movement or displacement of the sensor mounting bracket 52. This movement is detected by the sensor 50 which can be any conventional collision sensor typically used with vehicle passenger restraint systems, such as air bags. Once this force or displacement is detected by the sensor 50, the sensor 50 outputs a signal which activates the passenger restraint system, typically causing an air bag or bags in the front of the vehicle to inflate and restrain the forward movement of the front seat vehicle passengers.

Referring now to FIGS. 5–12, there is depicted a vehicle brush guard 60 mounted above the top wall or surface 12 of the bumper and in front of the grille and headlights of the vehicle. The brush guard 60 is in the form of a generally tubular frame formed of vertical and horizontal interconnected slats and posts. The brush guard 60 may take any suitable form.

Thus, for clarity and by way of example only, the brush guard 60 includes a center frame formed of a light bar 62 which is connected at opposite ends to a pair of generally planar vertical straps 64. The light bar 62 functions as a support for mounting auxiliary headlights on the vehicle.

A pair of laterally extending frame assemblies extend from the vertical straps 64 and are formed of upper and lower tubular members 66 and 68 which are interconnected by a plurality of vertical posts 70. Horizontal slats 72 extend between and are joined to the posts 70.

A frame formed of opposed vertically extending side legs 74 and an upper center cross bar 76 extends from the lower tubular members 68 on either side of the center frame and through the upper tubular members 66 and 68.

Figure 6:
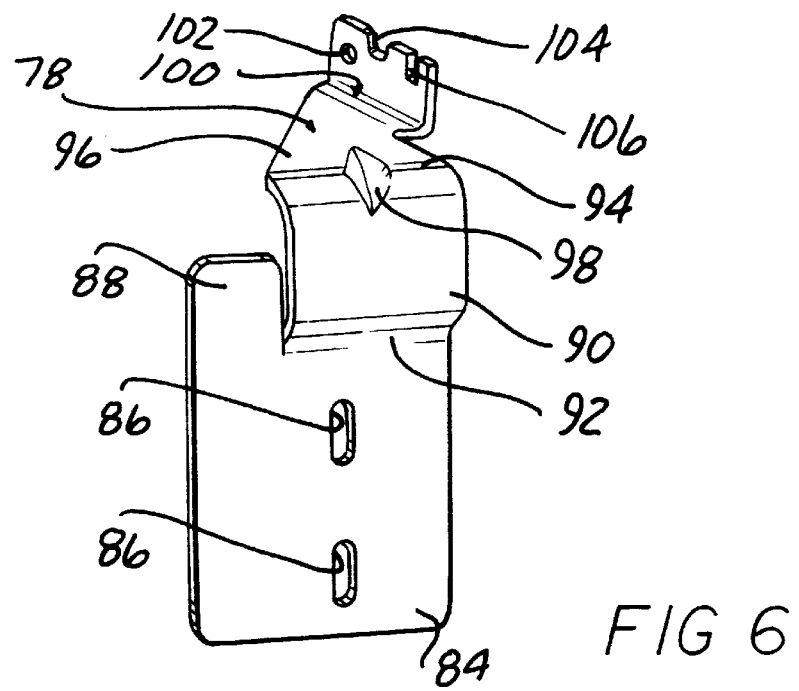
FIG. 6 is a perspective view of a driver side brush guard mounting bracket according to the present invention.

According to a unique feature of the present invention, a pair of brush guard mounting brackets 78 and 80 are provided for mounting the brush guard 60 to the vehicle at two locations. Two substantially mirror image brush guard mounting brackets 78 and 80 are provided as shown on FIGS. 6 and 7, respectively. As shown in FIG. 6 the first brush guard mounting bracket 78, which will typically be mounted on the driver's side of the center line of the vehicle, includes a generally planar portion 84 having a pair of apertures 86, preferably in the form of slots, formed therein for securing the bumper guard mounting bracket 78 to the bumper mounting bracket 26 by the bolts 32. An extension or tab 88 extends from the planar portion 84 and lies in the same plane as the planar portion 84.

A crush surface 90 is formed on the mounting bracket 78. For the mounting bracket 78, the crush surface 90 is unitarily formed as part of the planar portion 84, but is bent out of the plane of the planar portion 84 by a first bend 92. The crush surface 90 is formed as a planar surface extending from the bend 92 and is disposed generally parallel to, but offset from the planar portion 84.

The length or extent of the bend 92 places the outer surface of the crush surface 90 at a distance from the outer surface of the planar portion 84 substantially equal to the thickness of the planar portion 84. This enables the crush surface 90 to be in the same spatial position relative to the crush surface 54 as was the original crush surface 56 on the bumper mounting bracket 26.

A second bend 94 at the other end of the crush surface 90 forms a planer upper surface 96 generally perpendicular to the planar portion 84 and the crush surface 90. A dart 98 is formed through the second bend 94 for structural rigidity.

A flange 100 projects perpendicularly from one side of the upper surface 96. The flange 100 includes a mounting aperture 102, a clearance notch 104 and an open ended mounting slot 106.

Figure 7:
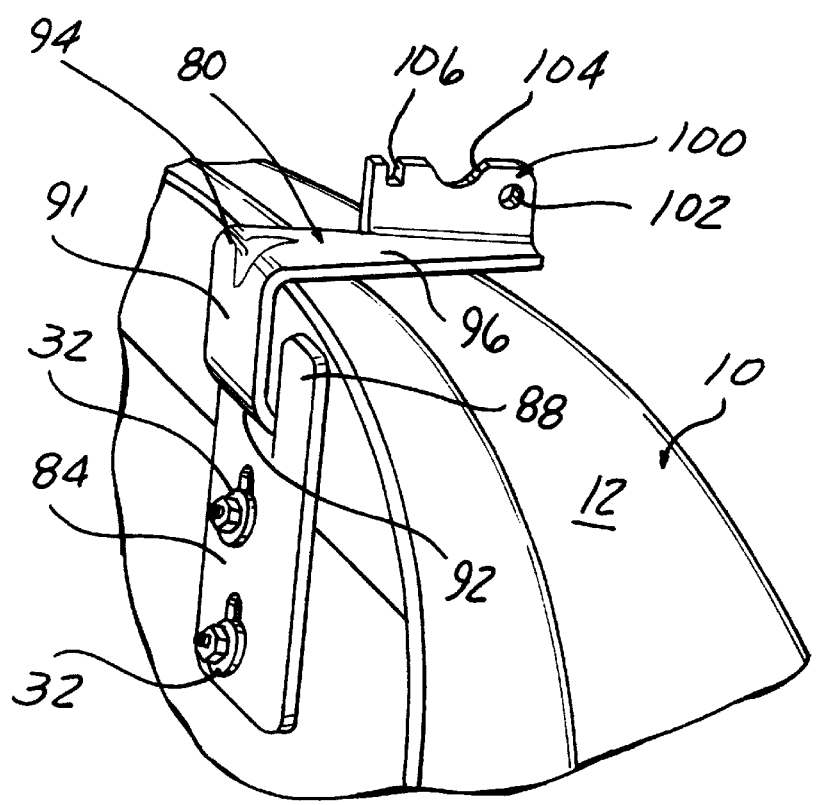
FIG. 7 is a perspective view showing a passenger side brush guard mounting bracket of the present invention depicted in its mounted position on the bumper mounting bracket attached to the vehicle bumper.

As shown in FIG. 7, the second brush guard mounting bracket 80 is similarly constructed and like components have been given the same reference number as the components of the first mounting bracket 78 described above and shown in FIG. 6.

Thus, the second brush guard mounting bracket 80 includes the planar portion 84 with an extension or tab 88 projecting therefrom. A pair of mounting slots, not shown in FIG. 7, are formed in the planar portion 84 for receiving the mounting bolts. The first bend 92 is formed in the planar portion 84 and forms an outwardly projecting surface 91 which is offset, but parallel to the planar portion 84. A second bend 94 forms an upper surface 96 perpendicular to the offset surface 91. The flange 100 is formed along one side of the upper surface 96 and includes the mounting aperture 102, the clearance notch 104 and the mounting slot 106.

Due to the particular vehicle engine component configuration, the tab 88, by example, rather than the surface 91 acts as the mating crush surface for the passenger side collision sensor mounting bracket.

As shown in FIGS. 6–9, both mounting brackets 78 or 80 are mountable with the planar portion 84 in registry with the center portion 30 of the bumper mounting bracket 26. The apertures or slots 86 in each planar portion 84 are alignable with the apertures in the center portion 30 of the bumper mounting bracket 26 to receive the bolts 32 as described hereafter.

Figure 9:
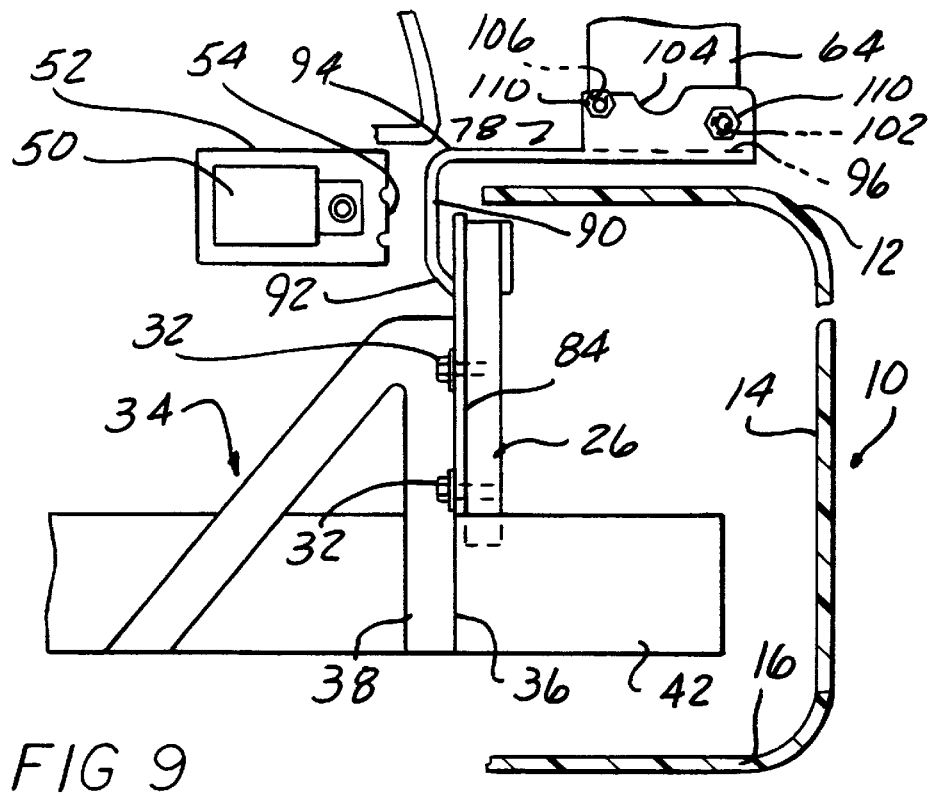
FIG. 9 is a side elevational view, partially cross-sectioned, depicting the spatial relationships of the vehicle brush guard mounting bracket, the bumper frame rail mounting bracket, the vehicle bumper and the crash sensor mounting bracket in their normal mounted position.
Figure 8:
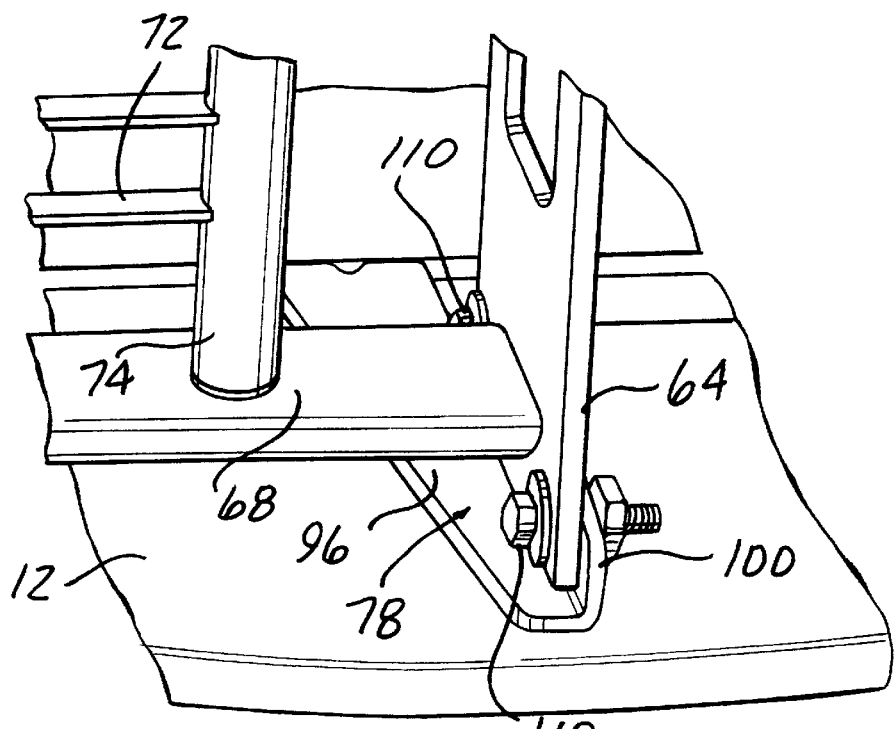
FIG. 8 is a perspective view showing the attachment of the vehicle brush guard to the brush guard mounting bracket shown in FIG. 7.

In this mounting position, the upper surface 96 of each mounting bracket 78 and 80 projects above and is spaced from the upper surface 12 of the vehicle bumper 10. This places the flange 100 above the upper surface 12 of the bumper 10 as shown in FIGS. 8 and 9. Mounting bolts 110 extend through aligned apertures formed on the bottom of the vertical strap 64 of the brush guard 60 and the mounting aperture 102 and mounting slot 106 on the flange 100 to fixably secure the brush guard 60 to the first and second mounting brackets 78 and 80 without contact with the bumper 10.

The open-ended mounting slot 106 enables the brush guard 60 to pivot and separate from the end of the flange 100 during a front end collision.

As shown in FIG. 9, the crush surface 90 on the first mounting bracket 78, when the planar portion 84 of the mounting bracket 78 is disposed between and secured to the bumper mounting bracket 26 and the bumper frame rail bracket 34, is spaced from the opposed crush surface 54 on the sensor mounting bracket 52 at the same position and at the same distance as was the original crush surface 56 which is removed from the bumper mounting bracket 26 so as to function in the same manner as the tab 56 during a front end collision to trigger the sensor 50 to activate the air bag at the proper time in the vehicle crush sequence.

Although not shown, the extension or tab 88 on the second mounting bracket 80 forms the crush surface for the mounting bracket 80 which is engagable with the crush surface on a passenger side sensor mounting bracket 52. The tab 88 is located in the same spacial relationship from the crush surface on one end of the sensor mounting bracket 52 on the passenger side of the vehicle as was crush surface on the bumper mounting bracket 26 on the passenger side of the vehicle. It should be noted that the passenger side bumper mounting bracket 26 does not include the rearward extending tab forming the crush surface 56 on the driver side bumper mounting bracket 26.

Figure 5:
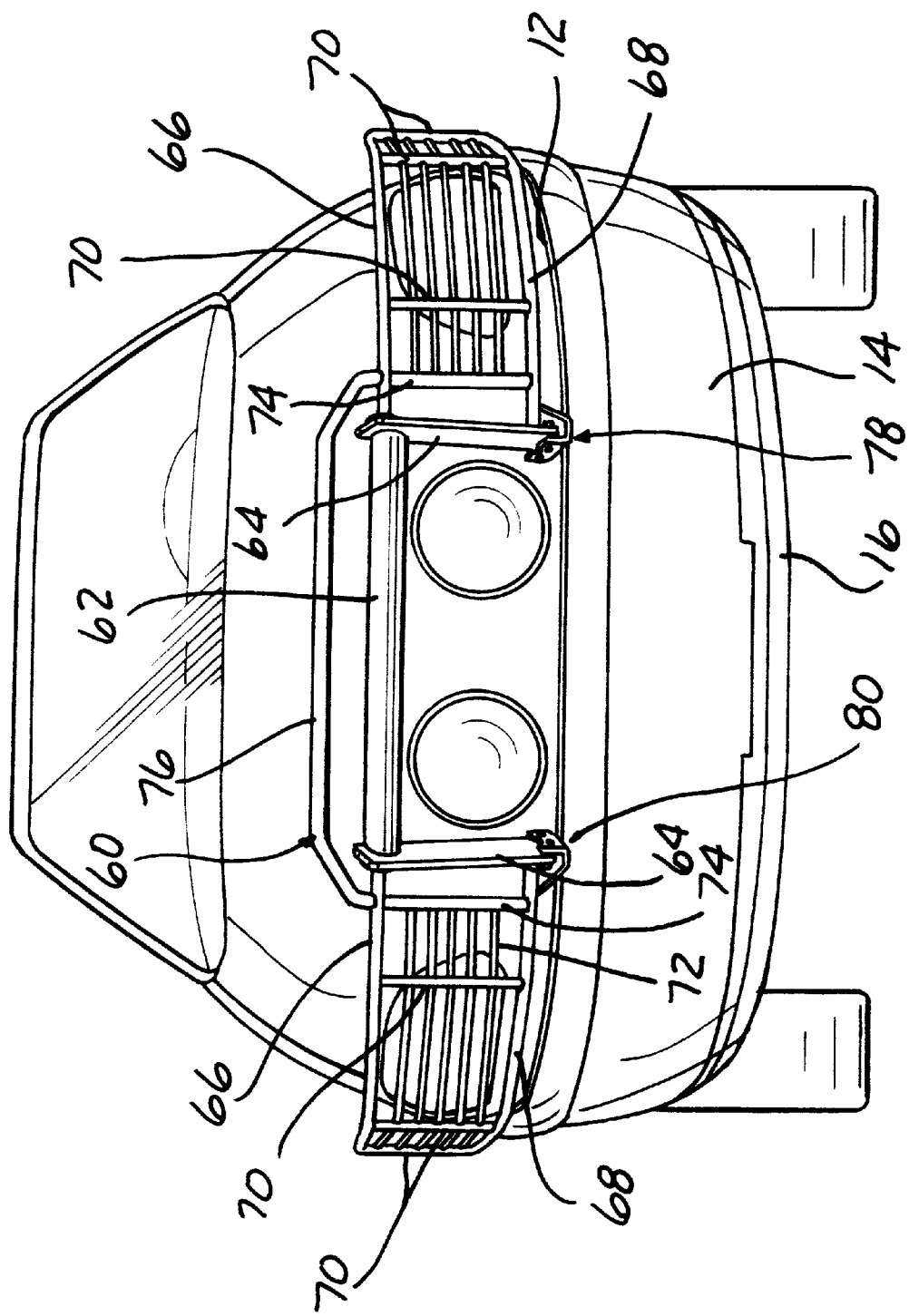
FIG. 5 is a front perspective view of a brush guard according to the present invention mounted on a vehicle in connection with the bumper and frame rail assemblies shown in FIGS. 2–4.

Referring now to FIGS. 10–12, there is depicted one of a pair of outriggers 120 which are used to releasable secure the outer ends of the brush guard 60 to the vehicle bumper 10. The outriggers 120 are optional, but are preferred when the brush guard 10 extends a considerable length along the vehicle bumper 10, such as shown in FIG. 5. Of course, smaller length brush guards, such as those covering only the center grille of a vehicle, would not necessarily require the outriggers 120.

Each outrigger 120, by example only, is in the form of a bent or formed metallic strap having a first end portion 122, an intermediate portion 124 extending angularly from the first end portion 122, and a second end portion 126 extending angularly from the intermediate portion 124, and generally perpendicular to the first end portion 122. As shown in FIG. 12, the first end portion 122 of each outrigger 120 is disposed behind the inner edge of the top wall 12 of the vehicle bumper 10 and has a mounting aperture 128 alignable with an aperture in a bumper side stiffener strap 132 and receiving the same fastener 134 used to secure one end of the stiffener strap 132 to the metal frame 18 behind the bumper 10.

The intermediate portion 124 of each outrigger 120 then extends angularly outward from the first end portion 122 to position the second end portion 126 generally parallel to the bottom surface to the bottom tubular member 68 on either side of the brush guard 60. A fastener, such as a bolt 134 shown in FIG. 10, is mountable through a mounting slot 130 on the second end portion 126 of each outrigger 120 and the bottom tubular member 68 of the brush guard 60. The mounting slot 130 enables the outrigger 120 to separate from the brush guard 60 during a collision.

In summary, the present invention is a unique vehicle attachment, such as a brush guard, mountable on a vehicle in a manner which does not alter the spatial relationship between the vehicle sensor activating crush surfaces.

What is claimed is:

1. In a vehicle having a bumper attached to a bumper mounting bracket mountable to two vehicle frame rails, an improvement comprising:

a brush guard; and a mounting bracket for mounting the brush guard to vehicle frame rails where a front surface of the brush guard is disposed longitudinally behind a vertical plane containing a front-most edge of the vehicle bumper.

2. The improvement of claim 1 wherein the brush guard has the front surface wholly longitudinally behind the front surface of the vehicle bumper.

3. The improvement of claim 1 wherein the mounting bracket comprises a pair of spaced mounting brackets for mounting to one of a bumper mounting bracket and one vehicle frame rail.

4. The improvement of claim 1 wherein:

the vehicle has a collision sensor with a crush surface nominally spaced from a bumper crush surface at a distance; and the mounting bracket having a crush surface spaced from the collision sensor crush surface at the distance.

5. The improvement of claim 4 wherein the mounting bracket is secured between the vehicle frame rail and the brush guard mounting bracket.

6. The improvement of claim 5 wherein the mounting bracket comprises:
   a first portion fixable to the vehicle bumper mounting bracket; and
   a second portion projecting angularly to the first portion and connectable to the brush guard.

7. The improvement of claim 4 further comprising:
   a pair of brush guard mounting members, each one of the pair of the brush guard mounting members having a crush surface nominally spaced from the sensor crush surface.

8. The improvement of claim 7 wherein each of the crush surfaces are spaced at the spacing from the respective sensor crush surface.

9. The improvement of claim 1 further comprising:
   outrigger support brackets mounted between a laterally outboard position of the brush guard and the vehicle bumper.

10. The improvement of claim 9 wherein:
    the brush guard is releasably connected to the outrigger support brackets.

11. The improvement of claim 1 wherein:
    the brush guard mounting bracket is moveably mountable on the bumper mounting bracket.

12. The improvement of claim 11 wherein:
    the brush guard mounting bracket is pivotal relative to the bumper mounting bracket under vehicle collision forces.

13. In a vehicle having a bumper attached to a bumper mounting bracket mountable to two vehicle frame rails, an improvement comprising:
    a brush guard; and
    a mounting bracket for mounting the brush guard to vehicle frame rails where a front surface of the brush guard is disposed wholly longitudinally behind a vertical plane containing a front-most edge of the vehicle bumper;
    the vehicle has a collision sensor with a crush surface nominally spaced from a bumper crush surface at a distance; and
    the mounting bracket having a crush surface spaced from the collision sensor crush surface at the distance.

14. The improvement of claim 13 wherein the mounting bracket is secured between the vehicle frame rail and the brush guard mounting bracket.

15. The improvement of claim 14 wherein the mounting comprises:
    a first portion fixable to the vehicle bumper mounting bracket; and
    a second portion projecting angularly to the first portion and connectable to the brush guard.

16. The improvement of claim 13 further comprising:
    a pair of brush guard mounting brackets, each one of the pair of the brush guard mounting brackets having the crush surface nominally spaced from a sensor crush surface.

17. The improvement of claim 16 wherein each of the crush surfaces are spaced at the spacing from the respective sensor crush surface.

18. The improvement of claim 13 further comprising:
    outrigger support brackets mounted between a laterally outboard position of the brush guard and the vehicle bumper.

19. The improvement of claim 18 wherein:
    the brush guard is releasably connected to the outrigger support brackets.

* * * * *